Dec. 24, 1963  G. BLONSKI  3,114,986
TOP WITH SOUNDING MEANS
Filed Nov. 20, 1961
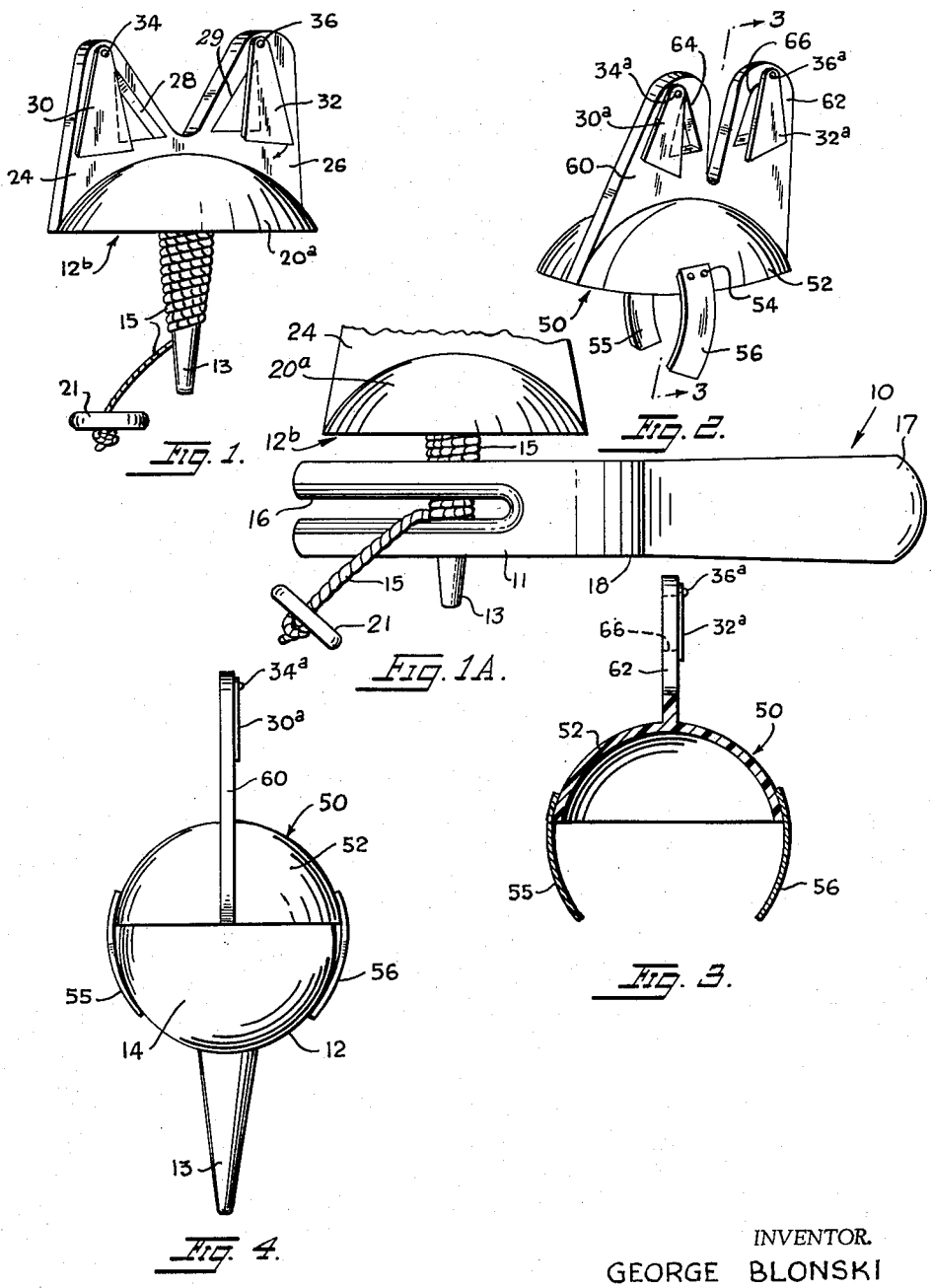
INVENTOR.
GEORGE BLONSKI
BY
ATTORNEY

United States Patent Office 3,114,986
Patented Dec. 24, 1963

3,114,986
TOP WITH SOUNDING MEANS
George Blonski, 161 Grand St., Brooklyn 11, N.Y.
Filed Nov. 20, 1961, Ser. No. 153,658
3 Claims. (Cl. 46—66)

This invention relates to the art of toys and particularly concerns an improved top spinner and top.

According to the invention there is provided a top spinner including a handle having spaced tines adapted to support the body of a top therebetween. One of the tines has a slot through which a string can be pulled. The string will be wound on the peg of the top. When the string is unwound the top is caused to spin at high speed. The top can then be thrown off the spinner to spin on its peg upon any suitable ground surface. The top may be formed with wings having openings to emit a whistling sound as the top rotates. The wings may be integral with the top body or may be formed on an attachment adapted to be removably secured to the top body. The openings in the wings are adjustable for varying the pitch of the whistling sounds emitted by the spnning top.

It is therefore one object of the invention to provide a top spinner having a double tine structure with a slot in one tine to pass a string therethrough.

A further object is to provide a top with apertured wings adapted to emit whistling sounds as the top rotates, the apertures in the wings being adjustable in size.

Another object is to provide an attachment for a toy top including a hollow shell having upwardly extending wings with openings of adjustable size therein, and with springs for removably mounting the attachment of the body of a top.

For further comprehension of the invention, of the objects and advantages thereof, reference will be had to the following description and accompanying drawings, and to the appended claims in which the various novel features of the invention are more particularly set forth.

In the accompanying drawings forming a material part of this disclosure:

FIG. 1 is a side elevational view of one form of top according to the invention.

FIG. 1A is a side elevational view of a top spinner in operative position on the top of FIG. 1.

FIG. 2 is a perspective view of a top attachment

FIG. 3 is a sectional view taken on line 3—3 of FIG. 2.

FIG. 4 is an elevational view of the attachment of FIG. 2 mounted on a modified form of top.

Referring to FIGS. 1 and 1A there is shown a spinner 10 including a handle 17 and a U-shaped body integral with the handle. The body has a bight 18 and two parallel tines. Tine 11 has a longitudinal slot 16 extending in from its free end. A top 12b having a partially spherical body 20a can be mounted on top of the tines with the peg 13 of the top extending downwardly between the tines. A cord 15 can be wound on the peg and passed through slot 16. A button 21 can be engaged on the free outer end of the cord. When the cord is pulled outwardly through slot 16 while the player holds the handle 17 of the spinner 10, the top will rotate rapidly and will slide or can be thrown off the tines onto the ground to rotate upon peg 13.

The body 20a is formed with integral wings 24, 26 disposed in a diametral plane on the upper curved surface of the body. The wings are formed with triangular openings 28, 29. Plates 30, 32 are pivotally attached to the wings respectively by pins 34, 36. The plates can be manually pivoted to adjustably close or open the openings to greater or lesser extent. When top 12b is spun by means of spinner 10, the top emits whistling sounds, whose pitch depends on the sizes of openings 28, 29.

FIGS. 2-4 illustrate a top attachment 50 in the form of a partially spherical shell 52. Arcuate leaf spring fingers 55, 56 are secured to the shell in diametrally opposed positions by pins or rivets 54. Integral with the shell and extending diametrally across its upper surface are curved wings 60, 62 having triangular openings 64, 66 formed therein. Adjustment plates 30$^a$, 32$^a$ are pivotally attached to the wings by pins 34$^a$, 36$^a$ for adjustably opening and closing the openings.

FIG. 4 shows how the attachment 50 fits on a top 12 having a round body 14 with spring fingers 55, 56 engaging around the body 14. The fingers extend circumferentially more than 180° around the spherical body to insure firm grip on the body of the top.

Top 12 with attachment 50 mounted thereon can be spun by means of spinner 10 as above described. The apertured wings will cause whistling sounds as the top rotates.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A toy assembly comprising a partially spherical shell adapted to seat on a spinning top, said shell having a pair of wings formed integral therewith and disposed in a diametral plane on the outer curved surface of said body, said wings having openings, imperforate members movably mounted on the wings adjacent to the openings for adjustably closing and opening said openings, and spring fingers secured to said shell and extending arcuately downwardly more than 180° so that said shell may be detachably secured on the spherical body of a spinning top.

2. The toy assembly as defined in claim 1, wherein the openings in the wings are triangular in shape and wherein the imperforate members consist of triangular-shaped plates hingedly connected at their apical ends to the wings adjacent the apexes of the openings.

3. A spinning top having a semispherical-shaped solid body with a flat undersurface, a peg depending from the center of the undersurface, a superstructure fastened on the top curve surface of the body across the center thereof, said superstructure consisting of a plate having a curved base conforming to the curvature of the body, said plate being dished at the center thereof providing wings on both sides of the center, said wings disposed in the same plane, said wings having triangular-shaped openings therein, and triangular-shaped plates hingedly connected to the wings at the apexes of the openings and swingable across the openings for closing and opening the same, whereby noise is created upon spinning of the body, said peg shaped to receive a cord in coiled formation for spinning the body.

References Cited in the file of this patent

UNITED STATES PATENTS

| | | |
|---|---|---|
| 712,946 | Matteson et al. | Nov. 4, 1902 |
| 1,207,200 | Novak | Dec. 5, 1916 |
| 1,257,448 | Belton | Feb. 26, 1918 |
| 1,264,733 | Williams | Apr. 30, 1918 |
| 1,363,307 | Burriss | Dec. 28, 1920 |
| 1,480,858 | Goetz | Jan. 15, 1924 |
| 1,907,084 | Morini | May 2, 1933 |

FOREIGN PATENTS

| | | |
|---|---|---|
| 507,830 | France | July 7, 1920 |